July 2, 1963  D. H. NEWHALL  3,095,900
POPPET VALVE
Filed April 3, 1961

Inventor
Donald H. Newhall
by Maxwell Fish
Atty.

United States Patent Office 3,095,900
Patented July 2, 1963

3,095,900
POPPET VALVE
Donald H. Newhall, Walpole, Mass., assignor to Harwood Engineering Company, Walpole, Mass., a corporation of Massachusetts
Filed Apr. 3, 1961, Ser. No. 100,099
3 Claims. (Cl. 137—516.25)

The present invention relates to an improved high pressure poppet valve having a nylon seating surface.

It is a principal object of the invention to provide a simple and effective poppet valve which is certain and completely leakproof in operation particularly at high pressures and is capable of giving dependable and satisfactory service over extended periods under conditions in which the valve is required to open and close with great frequency.

It is more specifically an object of the invention to provide an improved poppet valve which is so constructed and arranged as to permit the use of certain plastic materials having suitable qualities of strength, ductility, and plastic flow when subjected to great pressures of which the materials nylon and tetrafluoroethylene, having the trademark designation of Teflon are examples in a valve of the general type described adapted for use at very high pressures.

It is a further object of the invention to provide an improved poppet valve having a composite movable valve member comprised of a metal core and a sealing component of said high pressure responsive plastic material, for example, nylon in which said plastic sealing component of the valve is so formed as to provide an area which is unsupported by the underside pressure, and thereby to substantially increase the effectiveness of said high pressure responsive plastic sealing component of the valve when operating at high pressure.

A feature of the invention consists in the provision of an improved poppet valve having a composite movable valve member comprising a steel core having a tapered end seating portion and an upwardly extending stem portion, and a high pressure responsive plastic component, for example, nylon which is of generally cylindrical shape overlying said steel core, the lower end of said high pressure responsive plastic component being tapered to form an outward extension of the tapered seating portion of the valve member and having a central bore to receive the stem portion of the steel core. The high pressure responsive plastic component is fitted tightly to said stem to provide a leak-tight fit with said stem, and an air space is provided between the said high pressure responsive plastic component and the upper end of the stem. The arrangement is such that the area of the high pressure responsive plastic component overlying the upper end of the stem is unsupported thereby intensifying the pressure between the said high pressure responsive plastic component and the valve seat. A coiled spring acting against the upper end of the movable valve member provides an additional increment of pressure tending to hold the movable valve member against its seat.

With the above and other objects in view as may hereinafter appear, the several features of the invention consist also in the devices, combinations and arrangement of parts hereinafter described and claimed, which together with the advantages to be obtained thereby will be readily understood by one skilled in the art from the following description taken with the accompanying drawing in which:

The invention is herein disclosed as embodied in a poppet valve adapted for operation in a high pressure system under conditions in which the valve is required to open and close with great frequency. The valve comprises a stationary seat which may be of a metal such as steel, and a movable valve element which comprises a nylon valve closing component and a metallic core member which is constructed to support and to confine the nylon material during operation under the heavy pressures to which the valve is subjected.

Figure 1:
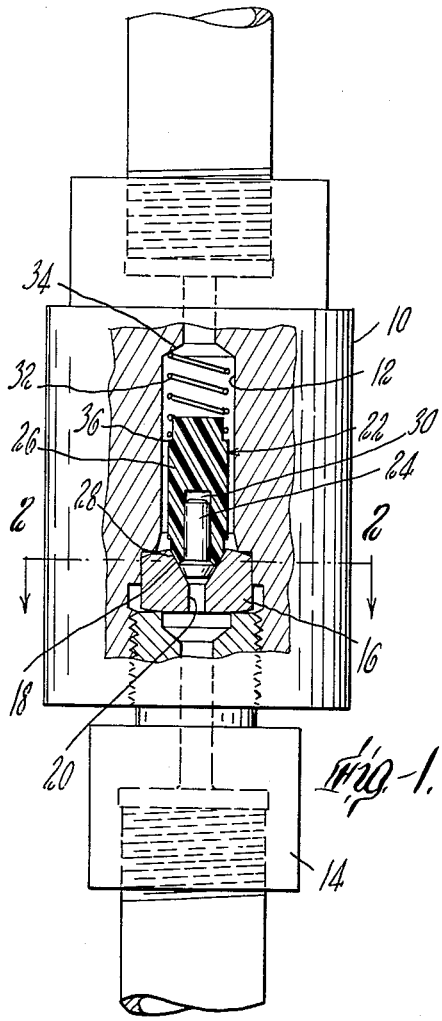
FIG. 1 is a longitudinal section of a poppet valve assembly embodying the several features of the invention.
Figure 2:
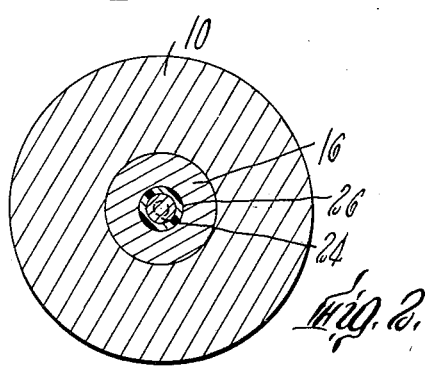
FIG. 2 is a section taken on a line 2—2 of FIG. 1.
Figure 3:
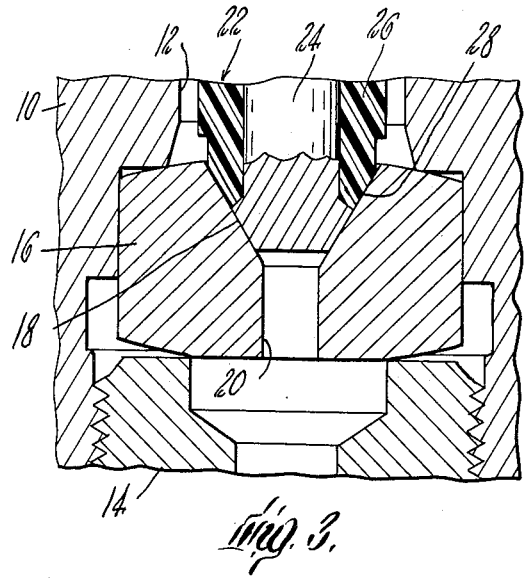
FIG. 3 is an enlarged detail view in section illustrating particularly the seating portions of the seat and movable valve member.

Referring particularly to FIGS. 1, 2, and 3 of the drawing the valve assembly comprises a cylindrical shell 10 having a central valve receiving bore 12, and having the lower end thereof threaded to a connecting pipe 14. The valve seat consists of a steel plug 16 which is fitted into an enlarged portion of the bore 12 and is held in place by the abutting end of the pipe 14. The plug 16 is provided with a tapered seating surface 18 which terminates at its lower end in an inlet conduit 20.

The movable element of the valve takes the form of a composite valve member 22 which comprises a steel core 24 having a tapered seat engaging tip portion which spans the inlet conduit 20 and engages against the adjoining portion of the tapered seating surface 18, and an upwardly extending stem portion which is of somewhat smaller diameter than the outer edge of the tip thus providing a narrow shelf or recess at the base of the stem.

A further component of said composite valve member 22 comprises a cylindrical member 26 composed of nylon which overlies the core member 24 and is loosely fitted externally to slide axially within the bore 12. At its lower end the cylindrical nylon member 26 is formed with a tapered surface which cooperates with the tapered seating surface 18 to provide a leakproof seal when the valve is closed. The cylindrical nylon member is formed with a central bore 30 which is shaped to fit tightly over the recessed and stem portions of the steel core member 24 and is of sufficient length to provide a free space between the nylon member 26 and the end surface of said stem. A compression spring 32 seated at one end against a shoulder 34 in the bore 12 and at its other end against a shoulder 36 on the outer surface of the cylindrical nylon member 26 tends to move the composite valve member to the valve closing position.

Figure 4:
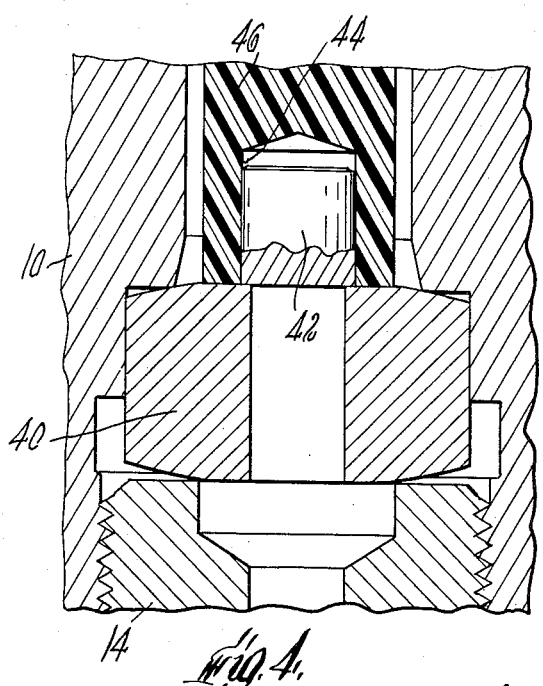
FIG. 4 is a detail sectional view similar to FIG. 3, but illustrating another embodiment of the invention in which the seating surface is formed as an optical flat.

FIG. 4 illustrates a modified form of the valve previously described in which the seating surface of the plug 40 employed in place of the plug 16 of FIGS. 1 through 3 is shown as an optical flat. In this case the steel core of the movable valve member takes the form of a cylindrical element 42 which is tightly fitted within a cylindrical recess 44 of a nylon sealing valve component 46. An air space is provided above the end of the steel core 42 providing an unsupported area which will intensify the pressure exerted against the relatively reduced area of the valve seat. As will be noted particularly from FIG. 4, the diameter of the steel core is sufficient so that it extends outwardly over the bearing surface of the valve seat 40. The downwardly extending sleeve portion of the nylon sealing component 46 is substantially flush with the bottom surface of the core 42 and provides, when the valve is moved to its closed position, a leaktight seal for the valve.

It will be understood that while two forms only of a poppet valve have been shown having a component movable metallic core and nylon valve member providing an unsupported area which will intensify the pressure exerted against the relatively reduced area of the valve seat, the invention is not specifically limited to said disclosed forms, but may be equally applied to valves having seats and valve closing surfaces of still other shapes.

Further while the valves shown are both of the general type which is directly responsive to changes in pressure it is contemplated that valves may be employed which are power operated, as by hydraulic, mechanical or other suitable means.

The material nylon has been found most suitable for use at very high pressures. The material tetrafluoroethylene, having the trademark designation of Teflon has been found suitable for use in valves which are subjected to pressures which while still considerable are of less magnitude than those for which nylon can be used.

The operation of the poppet valve shown in the drawing is as follows:

The valve opens when the pressure exerted against the underside of the valve member is sufficient to overcome the force exerted by the fluid pressure against the upper side of the valve member increased by the action of the spring 32. With each of the illustrated constructions having the steel core 24 or 42, fitted tightly to the internal bore of the associated cylindrical nylon sealing member and having the end of the core stem separated by an air space from said nylon member, an unsupported area for said nylon sealing member is provided.

The arrangement above described cooperates most effectively with the nylon material of which the cylindrical sealing component of the movable valve member is made to produce a tightly self-sealing poppet valve which will function well over a long period of constant use.

When the pressure ratio shifts sufficiently so that the downward pressure exerted on the movable valve member will close the valve, there is a tendency for the nylon material at the high pressures employed to run. This tendency is largely contained by the presence of the adjacent end portion of the steel core member 24 as shown in FIGS. 1 through 3, or the end portion of the flat faced steel core member 42 as shown in FIG. 4. A leakproof seal is instantly formed between the nylon member 26 and the tapered seating surface 18 backed by the steel core.

When the preponderance of fluid pressure operating against the underside of the valve member 22, for example, of FIGS. 1 through 3 inclusive is sufficient to overcome the fluid pressure acting against the upper side of the valve member 22 increased by the weight of the spring 32 the valve again opens.

The composite valve member above described for use in a high pressure system and consisting of a steel core and a component of nylon or other material having similar physical properties has been found to have important advantages. The material tends to flow when subjected to high pressures, but is also very strong, which permits same to be effectively supported and confined by adjacent portions of the steel core. It has been found, for example, that any imperfections or waste in the form of particles which may be carried by the pressure medium will be quickly enveloped and neutralized, so that a tight seal will be established with relation to the fixed seating surface of the valve. There is little or no abrasion or erosion of the nylon material as a result of the high pressures employed which substantially increases the life of the valve. The tendency of the nylon to flow tends also to overcome and to neutralize any irregularities or imperfections in the surface in the valve and seating elements.

The advantageous use of the nylon component of the valve member is in the present construction made possible through the use of the metallic supporting core which is constructed and arranged to produce an unsupported area which has the effect of greatly intensifying the pressure exerted by the nylon component against the seat. The intensification produced by means of the unsupported area has the effect, whenever the valve is closed, of establishing a strong initial seal between the valve and seating elements, which seal is strengthened and expanded over the full extent of the seating surface as the pressure acting on the valve member is rapidly brought up to its maximum strength.

The invention having been described what is claimed is:

1. For use in a high pressure poppet-type valve, a valve structure which comprises a seating element of hard material having an aperture and a seating surface having a straight line outward projection surrounding said aperture, a composite movable valve member shiftable by opposed valve seating and valve opening fluid pressures between a seating and an open position comprising a metallic core member having a seat engaging portion for engagement with a portion of said seating surface adjacent said aperture, and a stem portion, and a valve closing component of said movable valve member overlying said metallic core member composed of a plastic material having suitable qualities of strength, ductility, and plastic flow, said valve closing plastic component having a seating surface engaging portion forming an outward extension of said core member seating surface engaging portion and substantially flush therewith for effecting a simultaneous engagement of said seating surface engaging portions with said seating element along said straight line projection of said seating surface, and said valve closing plastic component having a centrally disposed upwardly extending bore open at its lower end to receive said stem portion of said core member and of a diameter to provide a leak-tight fit with said stem and extending longitudinally in excess of the length of said stem to provide an unsupported area of said valve closing component equal to the cross-sectional area of said stem, whereby, the effective pressure exerted by the seating portion of said valve closing plastic component against said seating element seating surface is substantially intensified to produce a strong initial seal between said valve closing plastic component and said seating element seating surface, said valve structure further defining a means biasing said composite movable valve member in a direction to close said valve.

2. A valve structure according to claim 1 in which the seating element is formed with a central aperture and a flat seating surface having a straight line outward projection surrounding said aperture.

3. A valve structure according to claim 1 in which the seating element is formed with a central aperture and a tapered seating surface having a straight line outward projection surrounding said aperture.

References Cited in the file of this patent

UNITED STATES PATENTS

| 1,301,278 | Labus | Apr. 22, 1919 |
| 2,862,515 | Briechle | Dec. 2, 1958 |

FOREIGN PATENTS

| 27,909 | Great Britain | Dec. 22, 1908 |